(12) United States Patent
Tang

(10) Patent No.: US 11,638,151 B2
(45) Date of Patent: Apr. 25, 2023

(54) METHOD AND DEVICE FOR RETRANSMITTING DATA

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 351 days.

(21) Appl. No.: 16/868,646

(22) Filed: May 7, 2020

(65) Prior Publication Data

US 2021/0076217 A1 Mar. 11, 2021

Related U.S. Application Data

(63) Continuation of application No. PCT/CN2017/110257, filed on Nov. 9, 2017.

(51) Int. Cl.
*H04W 12/106* (2021.01)
*H04L 1/08* (2006.01)
(Continued)

(52) U.S. Cl.
CPC ............ *H04W 12/106* (2021.01); *H04L 1/08* (2013.01); *H04L 41/06* (2013.01); *H04L 49/90* (2013.01);
(Continued)

(58) Field of Classification Search
CPC ... H04W 12/106; H04W 12/08; H04W 28/04; H04L 1/08; H04L 1/06; H04L 49/90;
(Continued)

(56) References Cited

U.S. PATENT DOCUMENTS

2011/0261747 A1* 10/2011 Wang .................. H04W 40/22
370/315
2014/0254393 A1* 9/2014 Yi ........................ H04W 64/00
370/242
(Continued)

FOREIGN PATENT DOCUMENTS

CN 102142942 A 8/2011
CN 102196496 A 9/2011
(Continued)

OTHER PUBLICATIONS

International Search Report (ISR) dated Jul. 25, 2018 for Application No. PCT/CN2017/110257.
(Continued)

*Primary Examiner* — Brian F Shaw

(57) ABSTRACT

A method and device for retransmitting data are provided. The method includes: receiving, by a first device, on a DRB, a first PDCP PDU transmitted by a second device; performing, by the first device, on a PDCP layer, an IP verification for the first PDCP PDU; transmitting, by the first device, a PDCP status report to the second device when the IP verification for the first PDCP PDU is failed and a trigger condition is met, where the triggering condition is used for triggering the first device to transmit the PDCP status report to the second device. Thus, it can be ensured that the first PDCP PDU transmitted by the second device is received on the DRB again by the first device when the IP verification for the first PDCP PDU is failed, thereby effectively solving the problem of data packet loss caused by a failure of IP verification.

12 Claims, 3 Drawing Sheets

(51) Int. Cl.
| | |
|---|---|
| *H04L 41/06* | (2022.01) |
| *H04L 49/90* | (2022.01) |
| *H04L 69/28* | (2022.01) |
| *H04L 69/324* | (2022.01) |
| *H04W 12/08* | (2021.01) |

(52) U.S. Cl.
CPC .......... *H04L 69/28* (2013.01); *H04L 69/324* (2013.01); *H04W 12/08* (2013.01)

(58) Field of Classification Search
CPC ..... H04L 69/28; H04L 69/324; H04L 69/322; H04L 1/1874; H04L 1/189; H04L 1/0026; H04L 1/188; H04L 1/1848; H04L 1/00
See application file for complete search history.

(56) References Cited

U.S. PATENT DOCUMENTS

2018/0206167 A1* 7/2018 Jactat .................. H04W 88/06
2020/0169887 A1* 5/2020 Wager ................. H04W 76/27

FOREIGN PATENT DOCUMENTS

| CN | 103314548 A | 9/2013 |
|---|---|---|
| WO | 2009/155582 A2 | 12/2009 |
| WO | 2009155582 A3 | 5/2010 |
| WO | 2010121408 A1 | 10/2010 |
| WO | 2016186697 A1 | 11/2016 |
| WO | 2017050222 A1 | 3/2017 |

OTHER PUBLICATIONS

Ericsson, 3GPP TSG-RAN WG2 #99 R2-1708096; Security Aspects of bearer harmonization, Berlin, Germany, Aug. 21-25, 2017.
The EESR of corresponding European application No. 17931143.6, dated Oct. 19, 2020.
"3rd Generation Partnership Project; Technical Specification Group Radio Access Network; NR; Packet Data Convergence Protocol (PDCP) specification (Release 15)", 3GPP Draft; R2-1704076 38323-005 NR PDCP Specification Clean, 3rd Generation Partnership Project (3GPP), Mobile Competence Centre; 650, Route Des Lucioles; F-06921 Sophia-Antipolis Cedex; France, May 14, 2017(May 14, 2017), XP051274689.
The first Office Action of corresponding European application No. 17931143.6, dated Aug. 25, 2022.

* cited by examiner

METHOD AND DEVICE FOR RETRANSMITTING DATA

CROSS-REFERENCE TO RELATED APPLICATION

This application is a continuation of the International Application No. PCT/CN2017/110257, filed on Nov. 9, 2017, the content of which is incorporated herein by reference in its entirety.

TECHNICAL FIELD

Embodiments of the present disclosure relate to the field of communications, and in particular, to a method and a device for retransmitting data.

BACKGROUND

With the pursuit of people for speed, delay, high-speed mobility, energy efficiency and the diversity and complexity of services in future life.

For this reason, the International Organization for Standardization of the 3rd Generation Partnership Project (3GPP) has already begun to develop the 5th Generation Mobile Communication Technology (5-Generation, 5G). When the New Radio (NR) is deployed in an early stage, it is difficult to obtain the complete NR coverage, so the typical network coverage is the wild-area long term evolution (LTE) coverage and the island coverage mode of NR. Also, since a large amount of LTE is deployed below 6 gigahertz (GHz), there is little spectrum available for 5G below 6 GHz. Therefore, for the NR, it is necessary to study the application of spectrums above 6 GHz, but the coverage of high frequency band is limited and the signal fading of high frequency band is fast.

In the prior art, in order to protect the mobile operators' previous investment on LTE, a working mode of tight interworking between LTE and NR is proposed. Specifically, the data is transmitted through LTE-NR Dual Connection (DC) supported by a band combination, thereby improving system throughput.

In LTE, there is no requirement for integrity protection for a data radio bearer (DRB), but the requirement for integrity protection for data on the DRB is added in NR, for this reason, I part, a Media Access Control (MAC) for integrity protection (IP) verification needs to be additionally carried in each Packet Data Convergence Protocol (PDCP) service data unit (SDU).

However, for data packet loss caused by the failure of the integrity protection verification on the PDCP layer, it cannot be guaranteed that no packet is lost through the retransmission triggered by a Radio Link Control (RLC) layer. But, the prior technical solutions do not involve how to solve the problem of data packet loss caused by a failure of IP verification.

SUMMARY

A method and a device for retransmitting data are provided, which can effectively solve the problem of data packet loss caused by the failure of IP verification.

In a first aspect, a method for retransmitting data is provided, including:
receiving, by a first device, on a DRB, a first PDCP PDU transmitted by a second device;
performing, by the first device, on a PDCP layer of the first device, an IP verification for the first PDCP PDU;
transmitting, by the first device, a PDCP status report to the second device when the IP verification for the first PDCP PDU is failed and a trigger condition is met, where the triggering condition is used for triggering the first device to transmit the PDCP status report to the second device.

Therefore, the second device is triggered, by the PDCP status report, to retransmit the first PDCP PDU on the DRB when the IP verification for the first PDCP PDU is failed, thus it can be ensured that the first device can receive the first PDCP PDU retransmitted by the second device on the DRB, thereby effectively solving the problem of data packet loss caused by a failure of IP verification.

In some possible implementations, the transmitting, by the first device, the PDCP status report to the second device when the IP verification for the first PDCP PDU is failed and the trigger condition is met, includes:
triggering the first device to transmit the PDCP status report to a second device when the IP verification for the first PDCP PDU is failed and a cumulative number of PDCP PDUs with failed IP verification on the PDCP layer of the first device is greater than or equal to a first threshold.

In some possible implementations, the first threshold is a threshold configured by a network device through a radio resource control RRC signaling.

In some possible implementations, the method further includes:
setting the cumulative number of PDCP PDUs with failed IP verification on the PDCP layer of the first device to zero, after the first device transmits the PDCP status report to the second device.

In some possible implementations, the transmitting, by the first device, the PDCP status report to the second device when the IP verification for the first PDCP PDU is failed and the trigger condition is met, includes:
triggering the first device to transmit the PDCP status report to a second device when the IP verification for the first PDCP PDU is failed and a time interval after the failed IP verification for the first PDCP PDU is greater than or equal to a second threshold.

In some possible implementations, the second threshold is a threshold configured by a network device through a radio resource control RRC signaling.

In some possible implementations, a timer is configured on the PDCP layer of the first device, and the method further includes:
stopping the timer after the first device transmits the PDCP status report to the second device; restarting the timer when the IP verification performed on the PDCP layer of the first device for a second PDCP PDU is failed, where the second PDCP PDU is a first PDCP PDU with failed IP verification after the first PDCP PDU.

In some possible implementations, the PDCP status report includes indication information used for indicating that the PDCP status report is a status report triggered by the failed IP verification performed on the PDCP layer of the first device.

In some possible implementations, the method further includes:
receiving again, by the first device, on the DRB, the first PDCP PDU transmitted by the second device.

In a second aspect, a method for retransmitting data is provided, including:
transmitting, by a second device, on a DRB, a first PDCP PDU to a first device;

receiving, by the second device, a PDCP status report transmitted by the first device;

determining, by the second device, whether to retransmit the PDCP PDU to the first device on the DRB, according to the PDCP status report.

In some possible implementations, the PDCP status report includes indication information used for indicating that the PDCP status report is a status report triggered by a failure of an IP verification performed on the PDCP layer of the first device, or the indication information is used for indicating that the PDCP status report is a status report triggered by the reestablishment of the PDCP layer of the first device by the first device.

In some possible implementations, the determining, by the second device, whether to retransmit the PDCP PDU to the first device on the DRB, according to the PDCP status report includes:

retransmitting, by the second device, on the DRB, the first PDCP PDU to the first device, when determining that the IP verification for the first PDCP PDU is failed according to the PDCP status report.

In some possible implementations, the method further includes:

buffering, by the second device, the first PDCP PDU.

In some possible implementations, the method further includes:

releasing, by the second device, buffered PDCP PDUs of the first PDCP PDU, when determining that the IP verification for the first PDCP PDU is successful according to the PDCP status report.

In some possible implementations, the method further includes:

releasing, by the second device, buffered PDCP PDUs of the first PDCP PDU, when a time interval in which no feedback is received after the first PDCP PDU is transmitted by the second device is greater than or equal to a third threshold.

In some possible implementations, the third threshold is a threshold configured by a network device through a radio resource control RRC signaling.

In a third aspect, a device is provided, including:

a transceiver unit, configured to receive a first PDCP PDU transmitted by a second device on a DRB;

a processing unit, configured to perform, on a PDCP layer of the device, an IP verification for the first PDCP PDU;

the transceiver unit is further configured to transmit a PDCP status report to the second device when the IP verification for the first PDCP PDU is failed and a trigger condition is met, where the trigger condition is used for triggering the device to transmit the PDCP status report to the second device.

In a fourth aspect, a device is provided, including:

a transceiver, configured to receive a first PDCP PDU transmitted by a second device on a DRB;

a processor, configured to perform, on a PDCP layer of the device, an IP verification for the first PDCP PDU;

the transceiver is further configured to transmit a PDCP status report to the second device when the IP verification for the first PDCP PDU is failed and a trigger condition is met, where the trigger condition is used for triggering the device to transmit the PDCP status report to the second device.

In a fifth aspect, a device is provided, including:

a transceiver unit, configured to transmit a first PDCP PDU on a DRB to a first device, and receive a PDCP status report transmitted by the first device;

a processing unit, configured to determine whether to retransmit the first PDCP PDU to the first device on the DRB according to the PDCP status report.

In a sixth aspect, a device is provided, including:

a transceiver, configured to transmit a first PDCP PDU on a DRB to a first device, and receive a PDCP status report transmitted by the first device;

a processor, configured to determine whether to retransmit the first PDCP PDU to the first device on the DRB according to the PDCP status report.

In a seventh aspect, a computer-readable medium is provided for storing computer programs, which include instructions for executing the embodiments of the method in the first or second aspect described above.

In an eighth aspect, a computer chip is provided, including: an input interface, an output interface, at least one processor, a memory, where the processor being used to execute codes in the memory, and when the code is executed, the processor being capable of implementing the processes executed by the first device in the method for retransmitting data in the first or the second aspect described above.

In a ninth aspect, a computer chip is provided, including: an input interface, an output interface, at least one processor, a memory, where the processor being used to execute a code in the memory, and when the code is executed, the processor being capable of implementing the processes executed by the second device in the method for retransmitting data in the first or the second aspect described above.

In a tenth aspect, a communication system is provided, including the first device and the second device as described above.

DESCRIPTION OF EMBODIMENTS

Figure 1:
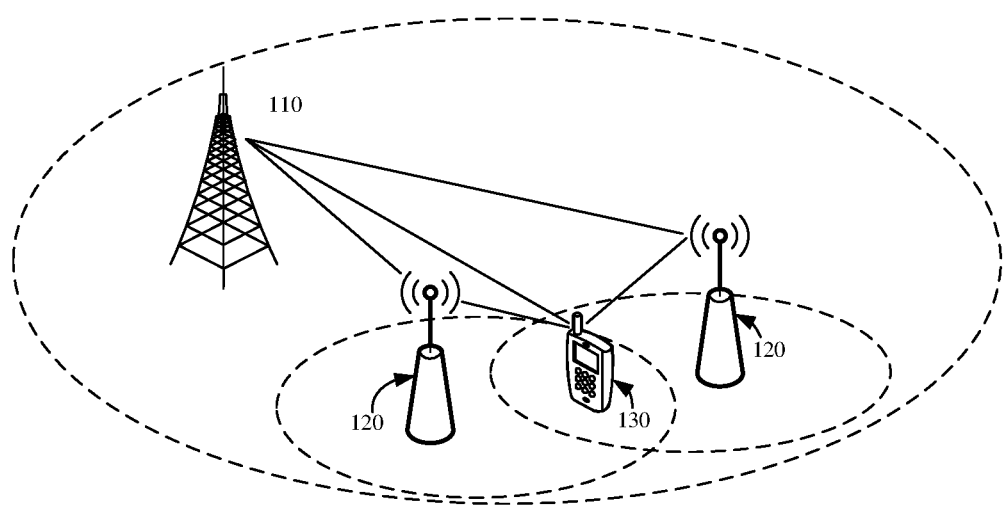
FIG. 1 is an example of an application scenario of the present disclosure.

FIG. 1 is a schematic diagram of an application scenario of an embodiment of the present disclosure.

Specifically, as shown in FIG. 1, network devices around a terminal device 130 include a master network device 110 and at least one secondary network device 120. The secondary network devices 120 are connected to the master network device 110 respectively to form multiple connections, and are connected to the terminal device 130 respectively to provide services thereto.

Specifically, the terminal device 130 may establish connections through the master network device 110 and the secondary network device 120 simultaneously. The connection established between the terminal device 130 and the master network device 110 is a master connection and the connection established between the terminal device 130 and the secondary network device 120 is a secondary connection. A control signaling of the terminal device 130 may be transmitted through the master connection, and a data of the terminal device may be transmitted simultaneously both through the master connection and the secondary connection, or may be transmitted only through the secondary connection.

More specifically, the master network device 110 may be an LTE network device and the secondary network device 120 may be a NR network device. Or, the master network device 110 may be a NR network device and the secondary network device 120 may be an LTE network device. Or, both of the master network device 110 and the secondary network device 120 may be NR network devices. However, the application scenario of the technical solution is not limited in embodiments of the present disclosure.

For example, the master network device may also be a GSM network device, a CDMA network device, etc., and the secondary network device may be a GSM network device, a CDMA network device, etc.

For another example, the master network device may also be a macro base station, and the secondary network device may also be a microcell, a pico cell, or a femto cell.

It should be understood that the terms "system" and "network" are often used interchangeably herein.

It should be noted that, in the above application scenario, it is assumed that the master network device is an LTE network device, and the secondary network device is a NR network device, where the LTE has no requirement for an integrity protection for DRB, but the NR requires an integrity protection for data on the DRB. For this reason, I part, the MAC for IP verification needs to be additionally carried in each PDCP SDU.

Specifically, integrity protection verification should be performed for every data packet at a data receiving end, and if the integrity protection verification is failed, it is likely that the data has been attacked and maliciously modified. The maliciously modified data should be discarded. However, in some services, a transmission with no data packet loss is required, that is, the packet loss is not permitted. For example, for a data transmission using AM mode on RLC, it is required to ensure that no data is lost. However, for data packet loss caused by the failure of the integrity protection verification on the PDCP layer, it cannot be guaranteed that no packet is lost through the retransmission triggered by the RLC layer.

In order to solve the above problem, a method for retransmitting data is provided in embodiments of the present disclosure, which can effectively solve the problem of data packet loss caused by the failure of IP verification.

Figure 2:
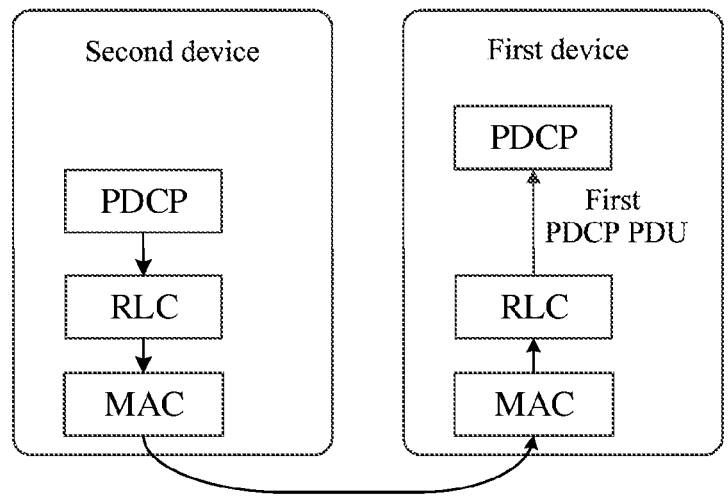
FIG. 2 is a schematic flowchart of a method for data transmission in an embodiment of the present disclosure.

FIG. 2 is a schematic flowchart of data transmission in an embodiment of the present disclosure.

As shown in FIG. 1, the data generated on the PDCP layer is transmitted to an RLC entity, and then mapped, by the RLC entity, to a physical layer carrier through a MAC layer entity (MAC entity).

In embodiments of the present disclosure, protocol data units on each sub-layer will be transmitted to the designated layers of a receiving end according to the difference of the data. Where, the data entering into each sub-layer without being processed is referred to as a SDU, and the data formed with a specific format after being processed on a sub-layer is referred to as a PDU.

That is, a SDU is an information unit transferred from a higher layer protocol to a lower layer protocol, i.e., the original data of the SDU is a PDU on an upper protocol layer. In other words, a PDU formed in the current layer is a SDU in the next layer.

For example, there is one RLC entity in every logical channel of each terminal device, and data received by an RLC entity from a PDCP layer or data transmitted to a PDCP layer, may be referred to as an RLC SDU (or PDCP PDU). Data received by an RLC entity from a MAC layer, or data transmitted to a MAC layer, may be referred to as an RLC PDU (or MAC SDU).

It should be understood that, in embodiments of the present disclosure, an RLC layer is located between a PDCP layer and a MAC layer, where the RLC layer may communicate with the PDCP layer through a Service Access Point (SAP), and may communicate with the MAC layer through a logical channel, which is not limited in embodiments of the present disclosure.

It should be further understood that, the receiving end and the transmitting end are involved in embodiments of the present disclosure, but are not specifically limited therein.

For example, the transmitting end is a network device, and the receiving end is a terminal device.

For another example, the transmitting end is a terminal device, and the receiving end is a network device.

For another example, both of the transmitting end and the receiving end may be terminal devices.

Where, a network device may refer to any entity at the network side used to transmit or receive signals. A network device may be, for example, a user equipment for machine type communication (MTC), a Base Transceiver Station (BTS) in GSM or CDMA, a base station (NodeB) in WCDMA, an Evolutional Node B (eNB or eNodeB) in LTE, or a base station device in the 5G network.

A terminal device may be any terminal device.

Specifically, a terminal device may communicate with one or more core networks through a Radio Access Network (RAN), and may also be referred to as an access terminal, a user equipment (UE), a subscriber unit, a subscriber station, a mobile station, a mobile unit, a remote station, a remote terminal, a mobile device, a user terminal, a terminal, a wireless communication device, a user agent, or a user apparatus. It may be, for example, a cellular phone, a cordless phone, a Session Initiation Protocol (SIP) phone, a Wireless Local Loop (WLL) station, a Personal Digital Assistant (PDA), a handheld device having a wireless communication function, a computing device or other processing device connected to a wireless modem, an in-vehicle device, a wearable device, or a terminal device in the 5G network.

Figure 3:
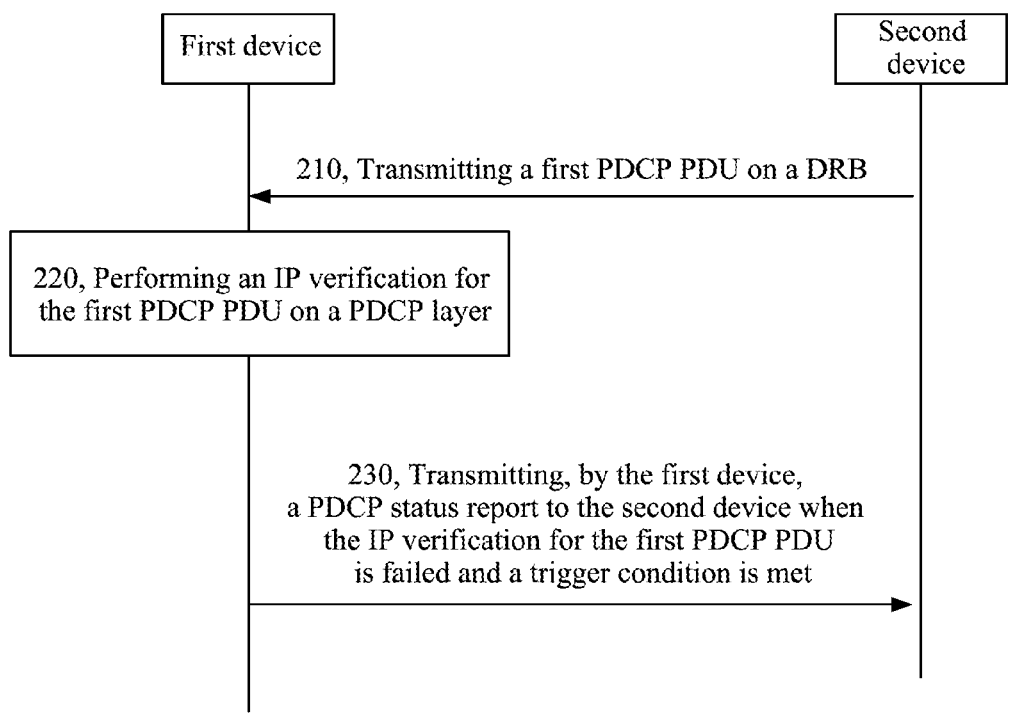
FIG. 3 is a schematic flowchart of a method for retransmitting data in an embodiment of the present disclosure.

FIG. 3 is a schematic flowchart of a method for retransmitting data in an embodiment of the present disclosure.

Specifically, as shown in FIG. 3, the method includes:

210, transmitting a first PDCP PDU on a DRB.

220, performing, by a PDCP layer, an IP verification for the first PDCP PDU on a PDCP layer.

230, transmitting, by the first device, a PDCP status report to the second device when the IP verification for the first PDCP PDU is failed and a trigger condition is met.

Specifically, the first device receives the first PDCP PDU transmitted by the second device on the DRB; the PDCP layer of the first device performs the IP verification for the first PDCP PDU; when the IP verification for the first PDCP PDU is failed and a trigger condition is met, the first device transmits a PDCP status report to the second device, where the trigger condition is used for triggering the first device to transmit the PDCP status report to the second device. In other words, the second device transmits the first PDCP PDU on the DRB to the first device; the second device receives the PDCP status report transmitted by the first device; the second device determines whether to retransmit the PDCP PDU to the first device on the DRB.

Therefore, when the IP verification for the first PDCP PDU is failed, the second device is triggered, by the PDCP status report, to retransmit the first PDCP PDU on the DRB, thus it can be guaranteed that the first device can receive the first PDCP PDU retransmitted by the second device on the DRB, thereby effectively solving the problem of data packet loss caused by a failure of IP verification.

The trigger conditions in embodiments of the present disclosure will be described below with reference to internal implementations of the first device.

In one embodiment, the first device may be triggered to transmit the PDCP status report to the second device when the IP verification for the first PDCP PDU is failed and a cumulative number of the PDCP PDUs with failed IP verification on the PDCP layer of the first device is greater than or equal to a first threshold.

It should be understood that the first threshold may be a threshold configured by a network device through a RRC signaling, which, however, is not limited in embodiments of the present disclosure.

Furthermore, the first device sets the cumulative number of PDCP PDUs with failed IP verification on the PDCP layer of the first device to zero, after transmitting the PDCP status report to the second device.

In another embodiment, the first device may be triggered to transmit the PDCP status report to the second device when the IP verification for the first PDCP PDU is failed and a time interval after the failed IP verification for the first PDCP PDU is greater than or equal to a second threshold.

It should be understood that the second threshold is a threshold configured by a network device through a radio resource control RRC signaling, which, however, is not limited in embodiments of the present disclosure.

Furthermore, a timer is configured on the PDCP layer of the first device, and the timer may be stopped after the first device transmits the PDCP status report to the second device; the timer is restarted when the IP verification performed by the PDCP layer of the first device for a second PDCP PDU is failed, where the second PDCP PDU is a first PDCP PDU with failed IP verification after the first PDCP PDU.

In addition, a status report may also be triggered by the reestablishment of the PDCP layer of the first device by the first device.

Therefore, in embodiments of the present disclosure, furthermore, the PDCP status report may also include indication information used for indicating that the PDCP status report is a status report triggered by a failure of an IP verification performed by the PDCP layer of the first device.

Accordingly, a status report triggered by the reestablishment of the PDCP layer of the first device by the first device also carries the indication information used for indicating that the PDCP status report is a status report triggered by the reestablishment of the PDCP layer of the first device by the first device.

Thus, the second device can determine whether the IP verification for the first PDCP PDU is successful according to the PDCP status report. Therefore, the second device may retransmit the first PDCP PDU to the first device on the DRB when determining that the IP verification for the first PDCP PDU is failed according to the PDCP status report.

It should be noted that, since the second device may need to retransmit the first PDCP PDU. Therefore, furthermore, the second device may buffer the first PDCP PDU for standby.

Furthermore, the second device releases the buffered PDCP PDUs of the first PDCP PDU when determining that the IP verification for the first PDCP PDU is successful according to the PDCP status report.

For example, when the time interval in which no feedback is received after the first PDCP PDU is transmitted by the second device is greater than or equal to a third threshold, the second device releases the buffered PDCP PDUs of the first PDCP PDU.

It should be understood that the third threshold is the information configured by the network device through a RRC signaling, which, however, is not limited in embodiments of the present disclosure.

It should also be understood that the above trigger conditions are merely exemplary, and are not specifically limited in embodiments of the present disclosure. For example, the trigger condition may also be a preconfigured condition, and the trigger condition, for example, may also be a combined condition of the above-described embodiments.

Figure 4:
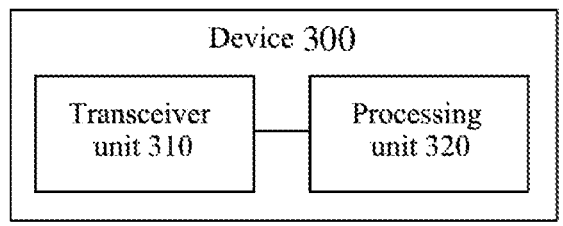
FIG. 4 is a schematic block diagram of a terminal device in an embodiment of the present disclosure.

FIG. 4 is a schematic block diagram of a first device in an embodiment of the present disclosure.

Specifically, as shown in FIG. 4, the device 300 includes:

a transceiver unit 310, configured to receive a first PDCP PDU transmitted by a second device on a DRB; a processing unit 320, configured to perform, on a PDCP layer of the device, an IP verification for the first PDCP PDU; the transceiver unit 310 is further configured to transmit a PDCP status report to the second device when the IP verification for the first PDCP PDU is failed and a trigger condition is met, where the trigger condition is used for triggering the device to transmit the PDCP status report to the second device.

In an embodiment, the transceiver 310 is specifically configured to:

trigger the device to transmit the PDCP status report to a second device when the IP verification for the first PDCP PDU is failed and a cumulative number of the PDCP PDUs with failed IP verification on the PDCP layer of the device is greater than or equal to a first threshold.

In an embodiment, the first threshold is a threshold configured by a network device through a RRC signaling.

In an embodiment, the processing unit 320 is further configured to:

set the cumulative number of PDCP PDUs with failed IP verification on the PDCP layer of the device to zero, after the PDCP status report is transmitted to the second device.

In an embodiment, the transceiver 310 is specifically configured to:

trigger the device to transmit the PDCP status report to a second device when the IP verification for the first PDCP PDU is failed and a time interval after the failed IP verification for the first PDCP PDU is greater than or equal to a second threshold.

In an embodiment, the second threshold is a threshold configured by a network device through a radio resource control RRC signaling.

In an embodiment, a timer is configured on the PDCP layer of the device, and the processing unit 320 is further configured to:

stop the timer after the PDCP status report is transmitted to the second device; restart the timer when the IP verification performed by the PDCP layer of the device for a second PDCP PDU is failed, where the second PDCP PDU is a first PDCP PDU with failed IP verification after the first PDCP PDU In an embodiment, the PDCP status report includes indication information used for indicating that the PDCP status report is a status report triggered by the failed IP verification performed by the PDCP layer of the device.

In an embodiment, the transceiver 310 is further configured to:

receive the first PDCP PDU transmitted by the second device on the DRB again.

Figure 5:
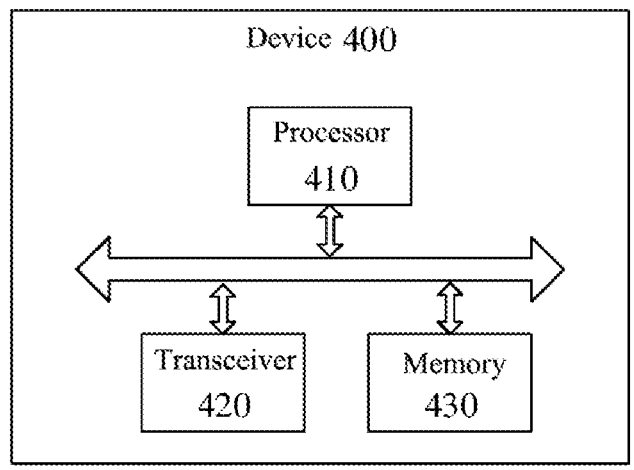
FIG. 5 is a schematic block diagram of another terminal device in an embodiment of the present disclosure.

It should be noted that the transceiver unit 310 may be implemented by a transceiver, and the processing unit 320 may be implemented by a processor. As shown in FIG. 5, a device 400 may include a processor 410, a transceiver 420, and a memory 430. Where, the memory 430 may be used to store indication information, and may also be used to store codes, instructions, etc. that are executed by the processor 410. The various components in the device 400 are connected by a bus system, where, the bus system includes a power bus, a control bus, and a status signal bus in addition to a data bus.

The device 400 shown in FIG. 5 is capable of implementing the foregoing processes implemented by the first device in the embodiments of the methods in FIG. 2 and FIG. 3, and is not described here again to avoid repetition.

Figure 6:
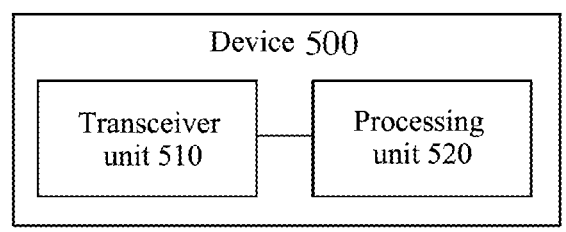
FIG. 6 is a schematic block diagram of a network device in an embodiment of the present disclosure.

FIG. 6 is a schematic block diagram of a second device in an embodiment of the present disclosure.

Specifically, as shown in FIG. 6, the device 500 includes:

a transceiver unit 510, configured to transmit a first PDCP PDU on a DRB to a first device, and receive a PDCP status report transmitted by the first device; a processing unit 520, configured to determine whether to retransmit the first PDCP PDU to the first device on the DRB according to the PDCP status report.

In an embodiment, the PDCP status report includes indication information used for indicating that the PDCP status report is a status report triggered by a failure of an IP verification performed by the PDCP layer of the first device, or the indication information is used for indicating that the PDCP status report is a status report triggered by the reestablishment of the PDCP layer of the first device by the first device.

In an embodiment, the processing unit 520 is specifically configured to:

retransmit the first PDCP PDU to the first device on the DRB, when the IP verification for the first PDCP PDU is determined to be failed according to the PDCP status report.

In an embodiment, the device further includes:

a buffering unit, configured to buffer the first PDCP PDU.

In an embodiment, the processing unit 520 is further configured to:

release the buffered PDCP PDUs of the first PDCP PDU when the IP verification for the first PDCP PDU is determined to be successful according to the PDCP status report.

In an embodiment, the processing unit 520 is further configured to:

release the buffered PDCP PDUs of the first PDCP PDU when a time interval in which no feedback is received after the first PDCP PDU is transmitted by the second device is greater than or equal to a third threshold.

In an embodiment, the third threshold is the information configured by a network device through a RRC signaling.

Figure 7:
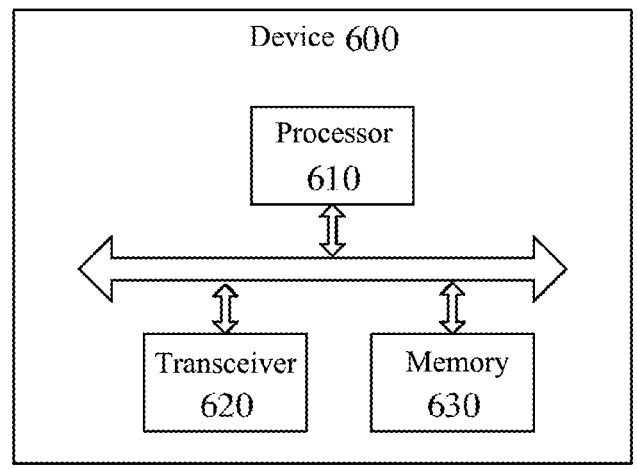
FIG. 7 is a schematic block diagram of another network device in an embodiment of the present disclosure.

It should be noted that the transceiver unit 510 may be implemented by a transceiver and the processing unit 520 may be implemented by a processor. As shown in FIG. 7, a device 600 may include a processor 610, a transceiver 620, and a memory 630. Where, the memory 630 may be used to store indication information, and may also be used to store codes, instructions, etc. that are executed by the processor 610. The various components in the device 600 are connected by a bus system, where, the bus system includes a power bus, a control bus, and a status signal bus in addition to a data bus.

The device 600 shown in FIG. 7 is capable of implementing the foregoing processes implemented by the second device in the embodiments of the methods in FIG. 2 and FIG. 3, and are not described here again to avoid repetition.

It should be understood that the embodiments of the method in embodiments of the present disclosure may be applied to or implemented by a processor.

In implementation process, the steps of the embodiments of the method in the present disclosure may be performed by the integrated logic circuit in the form of hardware or instructions in the form of software in the processor. More specifically, the steps of the method disclosed in connection with the embodiments of the present disclosure may be directly implemented by a hardware decoding processor, or implemented by a combination of hardware and software modules in the decoding processor. A software module may be located in a random access memory, a flash memory, a read-only memory, a programmable read-only memory, or an electrically erasable read-only memory, a register, or other storage medium as is well known in the art. The storage medium is located in a memory, and a processor reads information in the memory and completes the steps of the method in combination with hardware of the processor.

Where, the processor may be an integrated circuit chip having signal processing capability, and may implement or perform the methods, steps, and logic blocks disclosed in the embodiments of the present disclosure. For example, the above processor may be a general purpose processor, a Digital Signal Processor (DSP), an Application Specific Integrated Circuit (ASIC), a field programmable gate array (FPGA) or other programmable logic device, a transistor logic device, a discrete hardware component, etc. Furthermore, a general purpose processor may be a microprocessor or the processor may be any conventional processor or the like.

Furthermore, in embodiments of the present disclosure, the memory may be either a volatile memory or a nonvolatile memory, or may include both volatile and nonvolatile memory. Where, the non-volatile memory may be a read-only memory (ROM), a programmable read-only memory (PROM), an erasable read-only memory (erasable PROM, EPROM), an electrically erasable read-only memory (electrically EPROM, EEPROM), or a flash memory. The volatile memory may be a random access memory (RAM), which acts as an external cache memory. It should be understood that the above memories are exemplary but not limiting illustrations, for example, the memory in the embodiments of the present disclosure may also be a static random access memory (static RAM, SRAM), a dynamic random access memory (dynamic RAM, DRAM), a synchronous dynamic random access memory (synchronous DRAM, DRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchronous link DRAM, SLDRAM), a direct rambus random access memory (Direct Rambus RAM, DR RAM), and the like. That is, the memory of the systems and methods described herein is intended to include, without being limited to, these and any other suitable types of memory.

Finally, it should be noted that the terms used in the embodiments of the present disclosure and the appended claims is for the purpose of describing particular embodiments only and is not intended to be limiting of embodiments of the present disclosure.

For example, as the singular forms "a/an", "the" used in the embodiments of the present disclosure and the appended claims, are intended to include the plural forms as well, unless the context clearly indicates otherwise.

Also for example, the word "when . . . " as used herein may be interpreted as "if" or "assuming that . . . " or "in the case of . . . " or "in response to a determination" or "in response to a detection", depending on the context. Similarly, the phrases "if determined" or "if detected (a stated condition or event)" may be interpreted as "when determined" or "in response to a determination" or "when detected (a stated condition or event)" or "in response to a detection (a stated condition or event)", depending on the context.

A person with ordinary skill in the art will appreciate that the various illustrative elements and algorithm steps described in connection with the embodiments disclosed herein may be implemented as the electronic hardware or a combination of the computer software and the electronic hardware. Whether such functionality is implemented as the hardware or the software depends upon the particular application and design constraints imposed on the implementation. A person professionally skilled may implement the described functionality in varying ways for each particular application, but such implementations should not be interpreted as causing a departure from the scope of the present embodiments.

It is clear to a person with ordinary skill in the art that, for convenience and brevity of description, the specific working processes of the above-described systems, devices and units may refer to the corresponding processes in the foregoing embodiments of the method, and are not described herein again.

In several embodiments provided in the present application, it should be understood that the disclosed system, device, and method may be implemented in other ways. For example, the above-described embodiments of the device are merely illustrative, and for example, the division of the units is only a logical division, and there may be other divisions in actual implementation, for example, a plurality of units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

The units described as separate parts may or may not be physically separated, and parts displayed as units may or may not be physical units, may be located in one place, or may be distributed on a plurality of network units. Some or all of the elements may be selected according to actual needs to achieve the objectives of the embodiments of the present disclosure.

In addition, functional units in the embodiments of the present disclosure may be integrated into one processing unit, or each unit may exist alone physically, or two or more units are integrated into one unit.

If the present disclosure is implemented in the form of software functional units and sold or used as a stand-alone product, and may be stored in a computer readable storage medium. Based on such understanding, the technical solutions of the embodiments of the present disclosure may be embodied in the form of a software product, which is stored in a storage medium and includes several instructions for causing a computer device (which may be a personal computer, a server, or a network device) to execute all or part of the steps of the method described in the embodiments of the present disclosure. The aforementioned storage medium includes: a u disk, a removable hard disk, a read only memory, a random access memory, a magnetic or optical disk, etc. for storing program codes.

The above description is only a specific implementation of the embodiments of the present disclosure, but the scope of the embodiments of the present disclosure is not limited thereto, and any person skilled in the art can easily conceive of changes or substitutions within the technical scope of the embodiments of the present disclosure, and all such changes or substitutions should be covered by the scope of the embodiments of the present disclosure. Therefore, the protection scope of the embodiments of the present disclosure shall be subject to the protection scope of the claims.

What is claimed is:

1. A method for retransmitting data, comprising:
   receiving, by a first device, on a data radio bearer (DRB), a first packet data convergence protocol (PDCP) protocol data unit (PDU) transmitted by a second device, wherein the first device is a radio access network (RAN) and the second device is a user equipment (UE) that does not send a PDCP status report;
   performing, by the first device, on a PDCP layer of the first device, an integrity protection (IP) verification for the first PDCP PDU;
   transmitting, by the first device, the PDCP status report to the second device when the IP verification for the first PDCP PDU is failed and a trigger condition is met, wherein the triggering condition is used for triggering the first device to transmit the PDCP status report to the second device;
   wherein the transmitting, by the first device, the PDCP status report to the second device when the IP verification for the first PDCP PDU is failed and the trigger condition is met, comprises:
   triggering the first device to transmit the PDCP status report to a second device when the IP verification for the first PDCP PDU is failed and a time interval after the failed IP verification for the first PDCP PDU is greater than or equal to a second threshold;
   wherein a timer is configured on the PDCP layer of the first device, wherein the method further comprises:
   stopping the timer after the first device transmits the PDCP status report to the second device;
   restarting the timer when the IP verification performed on the PDCP layer of the first device for a second PDCP PDU is failed, wherein the second PDCP PDU is a first PDCP PDU with failed IP verification after the first PDCP PDU.

2. The method according to claim 1, wherein the transmitting, by the first device, the PDCP status report to the second device when the IP verification for the first PDCP PDU is failed and the trigger condition is met, comprises:
   triggering the first device to transmit the PDCP status report to a second device when the IP verification for the first PDCP PDU is failed and a cumulative number of PDCP PDUs with failed IP verification on the PDCP layer of the first device is greater than or equal to a first threshold.

3. The method according to claim 2, wherein the first threshold is a threshold configured by a network device through a radio resource control (RRC) signaling.

4. The method according to claim 2, wherein the method further comprises:
setting the cumulative number of PDCP PDUs with failed IP verification on the PDCP layer of the first device to zero, after the first device transmits the PDCP status report to the second device.

5. The method according to claim 1, wherein the second threshold is a threshold configured by a network device through a RRC signaling.

6. The method according to claim 1, wherein the PDCP status report comprises indication information used for indicating that the PDCP status report is a status report triggered by the failed IP verification performed on the PDCP layer of the first device.

7. A device, comprising:
a transceiver, configured to receive a first packet data convergence protocol (PDCP) protocol data unit (PDU) transmitted by a second device on a data radio bearer (DRB), wherein the device is a radio access network (RAN) and the second device is a user equipment (UE) that does not send a PDCP status report;
a processor, configured to perform, on a PDCP layer of the device, an integrity protection (IP) verification for the first PDCP PDU;
the transceiver is further configured to transmit the PDCP status report to the second device when the IP verification for the first PDCP PDU is failed and a trigger condition is met, wherein the trigger condition is used for triggering the device to transmit the PDCP status report to the second device;
wherein the transceiver is configured to:
trigger the device to transmit the PDCP status report to a second device when the IP verification for the first PDCP PDU is failed and a time interval after the failed IP verification for the first PDCP PDU is greater than or equal to a second threshold;
wherein a timer is configured on the PDCP layer of the device, and the processor is further configured to:
stop the timer after the PDCP status report is transmitted to the second device;
restart the timer when the IP verification performed on the PDCP layer of the device for a second PDCP PDU is failed, where the second PDCP PDU is a first PDCP PDU with failed IP verification after the first PDCP PDU.

8. The device according to claim 7, wherein the transceiver is configured to:
trigger the device to transmit the PDCP status report to a second device when the IP verification for the first PDCP PDU is failed and a cumulative number of the PDCP PDUs with failed IP verification on the PDCP layer of the device is greater than or equal to a first threshold.

9. The device according to claim 8, wherein the first threshold is a threshold configured by a network device through a radio resource control (RRC) signaling.

10. The device according to claim 8, wherein the processor is further configured to:
set the cumulative number of PDCP PDUs with failed IP verification on the PDCP layer of the device to zero, after the PDCP status report is transmitted to the second device.

11. The device according to claim 7, wherein the second threshold is a threshold configured by a network device through a RRC signaling.

12. The device according to claim 7, wherein the PDCP status report comprises indication information used for indicating that the PDCP status report is a status report triggered by the failed IP verification performed on the PDCP layer of the device.

* * * * *